US008594563B2

(12) United States Patent
Waters et al.

(10) Patent No.: US 8,594,563 B2
(45) Date of Patent: Nov. 26, 2013

(54) SECURITY FOR WIRELESS COMMUNICATION

(75) Inventors: Patrick Waters, Redlynch (GB); Stephanie Manning, Reading (GB)

(73) Assignee: Vodafone Group PLC, Newbury, Berkshire (GB)

( * ) Notice: Subject to any disclaimer, the term of this patent is extended or adjusted under 35 U.S.C. 154(b) by 866 days.

(21) Appl. No.: 11/816,263

(22) PCT Filed: Feb. 15, 2005

(86) PCT No.: PCT/GB2005/000538
§ 371 (c)(1), (2), (4) Date: Nov. 24, 2008

(87) PCT Pub. No.: WO2006/087503
PCT Pub. Date: Aug. 24, 2006

(65) Prior Publication Data

US 2009/0215385 A1 Aug. 27, 2009

(51) Int. Cl.
*H04B 5/00* (2006.01)
*H04K 3/00* (2006.01)
*H04M 1/66* (2006.01)
*H04M 1/68* (2006.01)
*H04M 3/16* (2006.01)

(52) U.S. Cl.
USPC ............................... 455/41.1; 455/1; 455/411

(58) Field of Classification Search
USPC ..................... 455/41.1, 41.2, 410, 411, 412.2
See application file for complete search history.

(56) References Cited

U.S. PATENT DOCUMENTS

| | | | | |
|---|---|---|---|---|
| 6,370,374 | B1 * | 4/2002 | Eichinger et al. | 455/411 |
| 6,988,657 | B1 * | 1/2006 | Singer et al. | 235/380 |
| 7,016,666 | B2 * | 3/2006 | Lauper et al. | 455/411 |
| 7,363,505 | B2 * | 4/2008 | Black | 713/186 |
| 7,493,288 | B2 * | 2/2009 | Biship et al. | 705/50 |
| 2002/0186845 | A1 | 12/2002 | Dutta et al. | |
| 2004/0100359 | A1 * | 5/2004 | Reade et al. | 340/5.2 |
| 2004/0110488 | A1 | 6/2004 | Komsi | |
| 2004/0124248 | A1 | 7/2004 | Selker | |
| 2004/0166831 | A1 * | 8/2004 | Tuomi et al. | 455/411 |
| 2005/0030384 | A1 * | 2/2005 | Lee et al. | 348/207.99 |
| 2005/0094812 | A1 * | 5/2005 | Terekhova et al. | 380/201 |
| 2005/0212673 | A1 * | 9/2005 | Forster | 340/572.7 |
| 2005/0216344 | A1 * | 9/2005 | Collet et al. | 705/14 |
| 2006/0165060 | A1 * | 7/2006 | Dua | 370/352 |
| 2006/0169771 | A1 * | 8/2006 | Brookner | 235/382 |
| 2009/0098825 | A1 * | 4/2009 | Huomo et al. | 455/41.1 |

* cited by examiner

*Primary Examiner* — Yuwen Pan
*Assistant Examiner* — Ayodeji Ayotunde
(74) *Attorney, Agent, or Firm* — Workman Nydegger

(57) ABSTRACT

A mobile terminal is disclosed which includes a near field or RFID tag (41). The mobile terminal (1) communicates with the mobile telecommunications network and is authenticated with that network using the SIM (15). The mobile terminal (1) is operable to obtain security data from the user thereof, such as a PIN or biometric data, or the mobile terminal (1) incorporates a sensor such as a light sensor, pressure sensor, heat sensor, skin resistant sensor or inertial sensor. The input device or sensor is used to confirm the identity of the user or to evaluate whether the user wishes to use the near field tag (41) to make a payment or obtain entry to a building (for example). Data from the sensor is passed to the SIM (15), which issues a command enabling the near field tag (41), via link (43). The near field tag (41) may then be read by a reader. The near field tag (41) may be automatically disabled after being read by the reader, after a predetermined time, or when the stimulus to the sensor is no longer present.

46 Claims, 6 Drawing Sheets

SECURITY FOR WIRELESS COMMUNICATION

TECHNICAL FIELD

The present invention relates to apparatus for controlling use of a near field communication device, including smart card means associable with a mobile telecommunications network for authenticating the smart card means with the network, to a method of controlling use of a near field communication device and to a communication device including near field communication means.

BACKGROUND TO THE INVENTION

Near field or RFID tags are known. Such tags may be incorporated into smart cards or other devices for use in obtaining entry to buildings or as electronic tickets for use of public transport or toll fee payment. Although such tags typically have to be brought into close proximity (less than 20 centimeters) of a reader, it is possible for a reader to exchange information with the tag without the owner's permission. Sensitive data stored on the tag could be stolen or changed. The tag may therefore participate in a sensitive or valuable transaction without the knowledge of the owner.

Known devices incorporating such tags may be provided with some protection against such mis-use. For example, the RF link between the card and the reader is of limited range, as discussed above. This should mean that the holder of the device incorporating the tag will be able to see the reader. However, it is possible for specialist radio equipment to extend the intended range within which communication between the tag and the reader can occur, and thereby exchange information with the tag without the owner's permission.

It is also known to encrypt the communication between the tag and the reader. Although encryption can be effective, it does not guard against unauthorised communication with a rogue reader, such as a genuine reader that has been stolen or a reader that has broken the encryption algorithm.

Another known but not widely used security precaution is to place the device including the tag in a metal or other enclosure that provides shielding to prevent RF access to the card. Although shielding is effective, it is not user convenient as it requires the user to remember to place the card in the shield. Further, if the user has several devices incorporating such tags, this can become even more inconvenient.

SUMMARY OF THE INVENTION

The present invention, in one aspect, seeks to provide additional or improved security.

According to a first aspect of the present invention, there is provided apparatus for controlling use of a near field communication device, including smart card means associable with a mobile telecommunications network for authenticating the smart card means with the network, wherein the smart card means is operable to receive from the mobile telecommunications network data for controlling use of the near field communication device and is operable to selectively enable the near field communication device in dependence upon the data.

The invention also relates to a mobile telecommunications network including such apparatus.

According to another aspect of the present invention, there is provided a method of controlling use of a near field communication device, including associating smart card means with a mobile telecommunications network for authenticating the smart card means with the network, transmitting to the smart card means from the mobile telecommunications network data for controlling use of the near field communication device and selectively enabling the near field communication device in dependence upon the data.

According to a further aspect of the present invention, there is provided a communication device including near field communication means; smart card means for authenticating the device with a mobile telecommunications network; means for enabling the smart card to receive data from the mobile telecommunications network to authenticate the device; and means for selectively enabling the near field communication means in dependence upon the data received by the smart card.

According to a further aspect of the present invention, there is provided a mobile telecommunication device for use with a mobile telecommunications network and including a near field device, wherein the mobile telecommunication device is operable to selectively enable the near field communication device.

BRIEF DESCRIPTION OF THE DRAWINGS

For a better understanding of the present invention, embodiments will now be described by way of example with reference to the accompanying drawings, in which.

In the drawings like elements are generally designated with the same reference number.

Modes of Carrying Out the Invention

Figure 1:
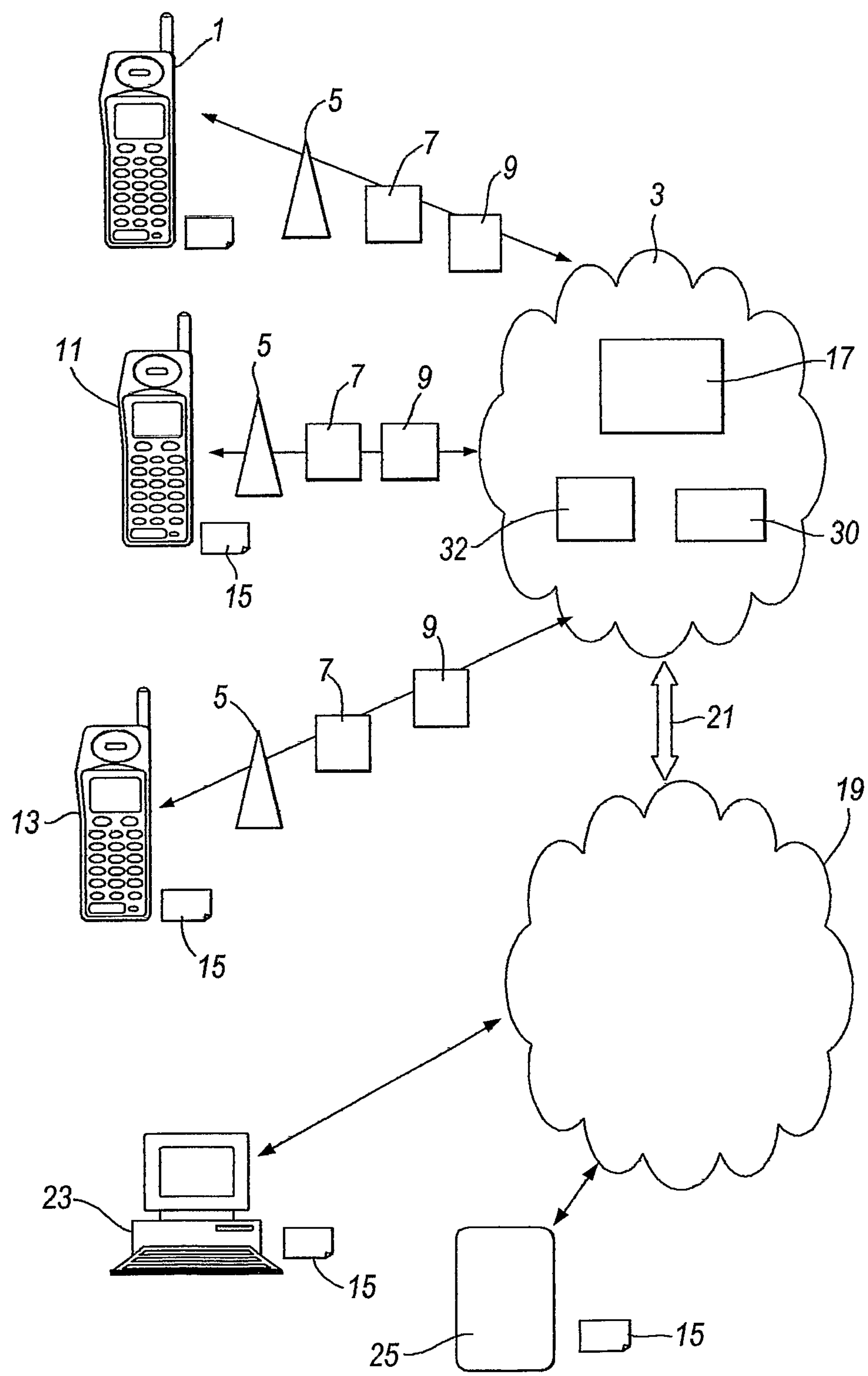
FIG. 1 shows schematically the elements of a communications network.

FIG. 1 shows schematically a network with which the invention may be used. Mobile terminal 1 is registered with GSM/GPRS or UMTS (3G) mobile or cellular telecommunications network 3. The mobile terminal 1 may be a handheld mobile telephone, a personal digital assistant (PDA) or a laptop computer equipped with a datacard. The mobile terminal 1 communicates wirelessly with mobile telecommunications network 3 via the radio access network (RAN) of the mobile telecommunications network 3, comprising, in the case of a UMTS network, base station (Node B) 5, and radio network controller (RNC) 7. Communications between the mobile terminal 1 and the mobile telecommunications network 3 are routed from the radio access network via GPRS support nodes (SGSN) 9, which may be connected by a fixed (cable) link to the mobile telecommunications network 3.

In the conventional manner, a multiplicity of other mobile terminals are registered with the mobile telecommunications network 3. These mobile terminals include mobile terminals 11 and 13. The terminals 11 and 13 communicate with the mobile telecommunications network 3 in a similar manner to the terminal 1, that is via an appropriate Node B 5, RNC 7 and SGSN 9.

The mobile telecommunications network 3 includes a gateway GPRS support node (GGSN) 17 which enables IP-based communications with other networks, such as the Internet 19 via an appropriate link 21. A multiplicity of terminals are connected to the Internet (by fixed or wireless links), and a PC terminal 23 and a PDA terminal 25 are shown by way of example.

Each of the mobile terminals 1,11 and 13 is provided with a respective smart card or subscriber identity module (SIM) 15. During the manufacturing process of each SIM, authentication information is stored thereon under the control of the mobile telecommunications network 3. The mobile telecommunications network 3 itself stores details of each of the SIMs issued under its control. In operation of the mobile telecommunications network 3, a terminal 1, 11, 13 is authenticated (for example, when the user activates the terminal in the network with a view to making or receiving calls) by the network sending a challenge to the terminal 1,11,13 incorporating a SIM 15, in response to which the SIM 15 calculates a reply (dependent on the predetermined information held on the SIM—typically an authentication algorithm and a unique key Ki) and transmits it back to the mobile telecommunications network 3. The mobile telecommunications network 3 includes an authentication processor 17 which generates the challenge and which receives the reply from the terminal 1,11,13. Using information pre-stored concerning the content of the relevant SIM 15, the authentication processor calculates the expected value of the reply from the mobile terminal 1,11,13. If the reply received matches the expected calculated reply, the SIM 15 and the associated mobile terminal are considered to be authenticated.

It should be understood that such an authentication process can be performed for any terminal provided with a SIM 15 under control of the mobile telecommunications network 3. In the embodiment the terminal communicates wirelessly with the mobile telecommunications network 3 via the network's radio access network, although this is not essential. For example, the terminal may communicate with the network via the fixed telephone network (PSTN), via a UMA "access point" and/or via the Internet. The PC 23 and the PDA 25 may also be provided with a SIM 15 under the control of the network.

The SIM 15 used by the terminal 1,11,13,23,25 may be a SIM of the type defined in the GSM or UMTS standards specifications, or may be a simulation of a SIM—that is, software or hardware that performs a function corresponding to that of the SIM. The SIM may be in accordance with the arrangement described in WO-A-2004 036513.

It should be noted that the authentication process being described does not necessarily authenticate the human identity of the user. For example, mobile telecommunication networks have pre-pay subscribers who are issued with SIMs in return for pre-payment, enabling them to use network services. However, the identity of such pre-pay subscribers may not be known by the network. Nevertheless, such a user cannot make use of the network until the network has authenticated the user's SIM—that is, has confirmed that such user is a particular user who has a particular pre-paid account with a network.

The network shown in FIG. 1 comprises both the mobile telecommunications network 3 and the Internet 19 (which itself comprises a multiplicity of other networks).

In addition to performing authentication functions, the SIM 15 may perform various other functions. For example, the SIM may store a directory of the names and telephone numbers of people frequently called by the user of the mobile terminal 1. Additionally, the SIM may store information which controls how the mobile terminal 1 is allowed to interact with the mobile telecommunications network 3. For example, the SIM may determine whether or not "roaming" of the mobile terminal 1 in a visited mobile telecommunications network is permitted.

The mobile telecommunications network 3 operator may wish to alter the information on a SIM 15, for example to introduce new services. In order to allow such updating of the SIM 15 in a rapid and cost-effective way, over-the-air (OTA) updating technology has been developed.

The mobile telecommunications network 3 includes an OTA gateway 30 that transforms updating messages from the network 3 into short messages (SMS messages) to be sent to the SIM 15. The OTA gateway 30 sends the SMS message to a short message service centre (SMSC) 32, which then transmits the short message to the relevant SIM 15 via the radio access network.

As indicated above, OTA updating is currently performed using the SMS bearer. However, it is also possible for the transport bearer to be CSD or GPRS. To perform OTA with CTS or GPRS bearer, CAT-TP/BIP or J2ME/JSR#177 mechanisms could be used. References in this specification to over-the-air updating includes references to updating by these bearers or any other similar bearers.

The OTA gateway 30 receives service requests through a gateway API that indicates the SIM that requires updating. The OTA gateway 30 includes a database including information about each SIM card associated with the network 3, including the card manufacturer, the card's identification number, the IMSI and the MSISDN. When card identification data is received by the OTA gateway 30, this database is used to address the OTA message to the relevant SIM. The OTA gateway 30 converts the service request information into a format that can be processed by the target SIM. The formatted message is sent to the SMSC 32, for example in the manner described in standards specification GSM 03.48 or TS 23.048. In order to perform the required update, a plurality of SMS messages may be required because currently SMS messages are restricted to 160 characters. The OTA gateway 30 is responsible for the integrity and security of the updating process.

In addition to receiving OTA updating messages by SMS, mobile terminal 1 is also capable of receiving conventional SMS messages—such as text messages to be read by the user of the mobile terminal 1. In order to distinguish an OTA updating SMS from a conventional SMS message, the OTA updating SMS message has its protocol identifier set to "SIM data download". The message will include ENVELOPE or UPDATE RECORD commands. The GSM or 3G application running on the mobile terminal 1 receives these commands and calls the OTA layer. The OTA layer checks the messages according to standards specification GSM 03.48 or TS 23.04. Each secured packet in the messages may contain one or more APDUs commands dedicated to Remote File Management or Remote Applet Management or SIM Tool Kit.

Figure 2:
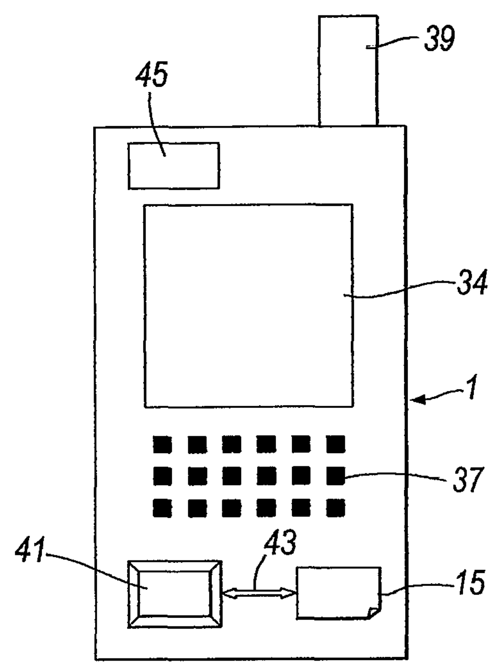
FIG. 2 shows schematically a mobile terminal in accordance with embodiment of the invention.

As shown in FIG. 2, mobile terminal 1 in accordance with the embodiment includes, in addition to SIM 15, a display 34, keypad 37 and an antenna 39 for communicating wirelessly with the mobile communications network 3. Further, the mobile terminal 1 includes a near field or RFID tag 41. The near field tag 41 operates in the unregulated RF band of 13.56 MHz in this embodiment although other frequencies could be used. No licences are required for the use of the near field devices in this RF band. However, each country imposes certain limitations on the electromagnetic emissions in this RF band. Limitations mean that in practice the distance at which the near field tag 41 can communicate with another device is typically less than 20 centimetres. Often the range of communication is such that the RF tag 41 must touch or almost touch the device with which it is to communicate. Communication may be using the Near Field Communication Interface and Protocol (NFCIP-1).

The near field tag 41 may operate in accordance with ISO-IEC 14443 and ISO-IEC 15693 standards. The tag 41 includes an inbuilt inductive antenna that allows the card to exchange information with a tag reader when the two are brought into close proximity, as described above. The reader may emit an RF signal to supply power to the tag to communicate with it if the tag is "passive". If the tag is "active" it will have a power supply and its operation is independently of the reader. The near field tag 41 may transmit selected information, such as an ID number (GU ID).

In order to improve the security of the near field tag, in the present embodiment it is proposed to use the SIM 15 of mobile terminal 1 to control to some extent the operation of the near field tag 41. The authentication process of a SIM 15 with a mobile telecommunications network, using the network's authentication processor 17 is considered to be highly secure. In this embodiment, this authentication of the SIM 15 is used to protect data held by the memory of the near field tag 41 from unauthorised access.

According to an important feature of this embodiment, the near field tag 41 is selectively enabled or disabled for communication with the reader under control of the SIM 15, by means of communication link 43. By means of the link 43, the SIM can enable or disable the near field tag 41 by, for example, rendering its antenna inoperative. In the disabled state, a reader is not able to obtain any information from the near field tag 41, even when brought into close proximity thereto (within a range that, in normal circumstances, near field communication would be possible).

Conveniently, the SIM 15 is provided with data which controls operation of the near field tag 41 by receiving an OTA message, which is sent to the mobile terminal 1 from the mobile telecommunications network 3 (via the OTA gateway 30 and SMSC 32). As described above, the OTA update message is received by the mobile terminal 1 and it is determined that this is an updating OTA update message rather than a conventional SMS message. The message is then passed to the SIM 15 for processing. Upon processing of the message, commands contained within that message are executed, causing the desired control of the RF tag 41 via the link 43.

In a first example, it is desired to only enable the near field tag 41 to communicate with the reader when it is in the vicinity of the user's office (where entry is obtained using the near field tag 41). The SMSC 32 may send an OTA update message to the node B 5 associated with the cell or group of cells in which the user's office is located. When the mobile terminal 1 enters a cell in the group, the node B transmits the OTA message to the mobile terminal 1. The procedure described above is applied, and the OTA message is passed to the SIM 15 and the instructions therein are processed. A command is sent to the near field tag 41 via link 43 to activate the near field tag (for example, by allowing its antenna to communicate with the reader). When the mobile terminal 1 moves to a different cell, a command is sent from the SIM 15, via the link 43, to disable the near field tag 41. This command may be issued in response to a further OTA message being received from the network 3 when the mobile terminal 1 moves to a different cell, or movement to a different cell may be detected automatically by the SIM (or the mobile terminal 1) and used to generate an appropriate command for sending to the near field tag 41.

The near field tag 41 may be rendered completely inoperable when not in the location of the cell of the user's office. Alternatively, the near field tag 41 may be partially disabled (for example, by rendering the antenna inoperable). In this partially disabled mode the tag 41 may perform certain functions, such as allowing its codes or other data to be reprogrammed.

In the second example, a user wishes to use the near field tag 41 of the mobile terminal 1 to pay for travel by public transport (for example on the London Underground), where entry barriers are equipped with a suitable near field tag reader. Because the commuter travels at particular, consistent times of day, it is desirable to enable the near field tag 41 only at those times, in order to provide improved security. When so configured, if the mobile terminal 1 incorporating the near field tag 41 were stolen, the thief would not be able to pay for use of public transport using the near field tag 41 outside the times specified.

The mobile telecommunications network 3 is configured to transmit an OTA message to the mobile terminal 1 at the beginning of the time period during which the commuter begins their normal journey. As before, this message is received and interpreted by the SIM, which sends an instruction to enable the near field tag 41 via the link 43. The near field tag 41 is then able to communicate with readers to allow use of public transport. At the end of the time period during which the commuter completes their usual journey, a second OTA message is sent by the network 3 to the mobile terminal 1. This OTA message is received and interpreted by the SIM 15, and sends an appropriate deactivation instruction to the RF tag 41 via the link 43. The near field tag 41 is thereafter not able to allow the user to obtain access to public transport.

A similar arrangement could be used, for example, to enable a school child to pay for their lunch using the near field tag 41. OTA messages would be sent at the beginning and the end of the school lunch time so that the near field tag 41 could only be used to make a payment during the appropriate time.

The times at which, and the circumstances in which, the OTA messages are sent by the mobile telecommunications network 3 to the user's SIM card 15 may be set by the user of the mobile terminal 1. For example, the user of the mobile terminal 1 may initiate a communication session (such as a SIP communication session) with the mobile telecommunications network 1 to configure the times or places in which the RF tag 41 should be enabled. This updating process may require entry of a password, or employ some other security mechanism, to prevent unauthorised persons from reconfiguring the times and/or locations at which the near field tag is rendered operable or inoperable. Alternatively, the user may configure the times and/or locations at which the OTA messages are sent by some other mechanism—for example, by providing verbal instructions to the operator of mobile telecommunications network 3 by a mobile or PSTN telephone call, or by visiting the website of the mobile telecommunications network operator (whether using the mobile terminal 1 or independently thereof using a PC connected to the Internet).

Rather than the user of the mobile terminal 1 determining when/where the RF tag 41 is activated, this may be determined by the mobile telecommunications network 3 or some other entity. For example, a school child's parent may set the times during which the school child is able to use their RF tag to make payments, in the example given above relating to paying for a school lunch. In the example given above relating to payment for public transport, the public transportation authority may alternatively or additionally be able to control when OTA messages are sent so that, if it is notified that the mobile terminal 1 incorporating the near field tag 41 has been stolen, that authority can permanently or temporarily deactivate the near field tag 41.

In an alternative embodiment, the SIM 15 activates and deactivates the tag in dependence upon whether the SIM is authenticated with the mobile telecommunications network (using the authentication algorithm and the unique Ki in the manner described above).

Typically, when the mobile terminal 1 is powered up within the coverage area of the mobile telecommunications network 3, the authentication process between the SIM 15 and the authentication processor 17 of the network 3 occurs automatically. When this authentication has been completed, a message is sent to the near field tag 41, via the link 43, to enable operation of the tag. When the SIM 15 is no longer authenticated (for example, when the mobile terminal 1 is powered down), a further message is sent from the SIM 15 to the near field tag 41, via the link 43, to deactivate the near field tag 41.

In the modification to this arrangement, the mobile terminal 1 does not have to be always authenticated with the network 3 for the tag 41 to be enabled. However, the tag 41 is configured so that it is only enabled when it receives messages from the SIM 15 indicating that the SIM 15 has been authenticated at predetermined times or events—for example, once a day or on powering on/off of the mobile terminal 1. Such an embodiment is advantageous because, if the mobile terminal 1 is stolen, both the SIM 15 and the near field tag 41 can be disabled together by sending a single OTA message.

In another embodiment of the invention, the mobile terminal and/or near field tag 41 is provided with means for disabling the tag 41 without requiring communication between the mobile terminal 1 and the mobile telecommunications network 3 (and therefore without requiring receipt of an OTA message).

The near field tag 41 may be selectively enabled and disabled in order to reduce the opportunity to obtain information from the near field tag 41 by an unauthorised reader.

The following arrangements are useful if the near field tag 41 is to be enabled and disabled for fairly long periods of time:

(1) Personal identification number (PIN) entry—the keypad 37 of the mobile terminal 1 is used to enter a PIN (or other secret password) to enable the near field tag 41. The user's PIN may be stored in a secure location in the mobile terminal 1 or in the SIM 15. When the user enters their PIN using the keypad 37, the entered PIN is compared with the stored PIN. If the PINs match, the SIM transmits a message, via link 43, to the near field tag 41 to activate the near field tag.

(2) Biometric data entry—the mobile terminal 1 may incorporate a fingerprint reader 45. The fingerprint reader 45 scans the fingerprint of the user when the user's finger is placed on the reader 45 and compares it to the user's fingerprint stored in the memory of the mobile terminal 1 or the SIM 15. If the fingerprints are determined to match, the message is sent from the SIM 15, via link 43, to the RF tag 41. As an alternative to a fingerprint, other biometric data could be used—for example, voice recognition (using the mobile terminal's built-in microphone and a voice recognition algorithm within the mobile terminal 1 or SIM card 15) or retinal scanning (using the mobile terminal's built-in camera).

Arrangements (1) and (2) above may advantageously be combined with an RF tag 41 that automatically deactivates after it has been read by a reader. That is, the user will activate the RF tag by entering their PIN or biometric data prior to bringing the mobile terminal 1 into proximity to the reader. After successful reading of the RF tag 41, the RF tag automatically disables itself so that no further reading can occur without the PIN or biometric data being re-entered. If the mobile terminal 1 is lost or stolen, an unauthorised person cannot use the RF tag 41.

Arrangements (1) and (2) above are fairly inconvenient if a user wishes to activate their RF tag 41 fairly frequently. The following arrangements may be more convenient when relatively frequent activation of the RF tag 41 is required:

(1) Light sensor—for example a photodiode (a sensor that modifies an electric current when exposed to a light source) could be built into the casing of the mobile terminal 1 and act as a switch to activate or deactivate the RF tag 41. The RF tag 41 is controlled by the photo diode so that the RF tag 41 is only enabled when the mobile terminal 1 is exposed to light. Therefore, when the mobile terminal 1 was in an opaque case or the user's pocket, the RF tag 41 will be disabled. The photodiode may be sensitive to a particular frequency range—for example visible light, infra red or ultra violet. The tag reader may be provided with a light emitter that emits light at this frequency, in order to activate the tag.

(2) Pressure sensor—a pressure sensor on the casing of mobile terminal 1 acts as a switch. The RF tag 41 is only enabled when the user physically presses the pressure sensor. Therefore, when the mobile terminal is in a case or the user's pocket, the pressure sensor is disabled. The pressure sensor may itself be deactivated by the user, for example, when a function of the mobile terminal 1 is selected such that the keypad 37 is inoperative. The pressure sensor may be combined with the fingerprint scanner 45. The combined sensor detects, not only that pressure is applied, but also that an authorised person is pressing the sensor. Alternatively, the pressure sensor could be combined with an electrical resistance meter and used to detect that it is a human hand pressing the pressure sensor, rather than some other object.

(3) Heat sensors—such sensors incorporated in an appropriate position on the casing of the mobile terminal 1 could be configured to detect that the mobile terminal is in a user's hand by detecting the heat from the hand, and only enabling the near field tag 41 when heat from the hand is so detected.

(4) Skin resistance sensor—a skin resistance sensor may be provided on the casing of the mobile terminal 1 in dependence of the presence of the pressure sensor described above. The near field tag 41 will only be operated when an appropriate resistance, capacitance or inductance is detected, indicating that the user's hand is touching the sensor.

(5) Inertial sensors. An inertial sensor incorporated in the mobile terminal can be used to detect that the user is moving the terminal (and tag 41) around at a sufficient speed to indicate that it is to be used. Inertial sensors may be based on micro-accelerators, which are commonly used in motion detectors—for example in gaming and virtual reality/remote control systems.

Arrangements (1) to (5) immediately above activate the radio frequency tag 41 in dependence upon ambient conditions (light, pressure, heat, movement etc.) which change from when the card is being stored to when the card is required to be active. Other types of ambient sensors could be used and are within the scope of the invention. The arrangements (1) to (5) described above could be combined with an arrangement for automatically deactivating the near field tag 41 after it has been read once, or alternatively the tag 41 may deactivate when the ambient conditions change (for example the light/pressure/heat/movement is no longer applied).

Alternative arrangements for protecting the data associated with the near field tag 41 are identified below and are useful for single or multiple RF tags or where the RF tag is not in a user's possession (such as in tagging systems):

(1) Jamming device—the near field tag 41 and/or the mobile terminal 1 is designed to jam/disrupt the low level communications of all other RF tags within range of the jamming device. Instead of following the anti-collision protocol commonly used in near field tag technology, the device attempts to create collisions and other forms of interference. The jamming device is disabled, or the near field tag 41 is removed from proximity of the jamming device, when authorised use of the card is required.

(2) Round trip detector—to guard against access from RF fields that have been greatly extended, the mobile terminal or near field tag 41 has a round trip delay tester (that measures the time taken for a signal to travel from the near field tag 41 to the reader and back to the tag 41). It sends a test signal when the near field tag 41 is being read/probed and expects a response within a certain round trip delay. If the response is not received after a predetermined delay, the near field tag is disabled either permanently or temporarily.

(3) Shielding—a case for the mobile terminal 1 may have a thin metal plate sewn into the fabric (or otherwise incorporated therein) of the case in order to conveniently shield the near field tag 41.

A mobile terminal 1 may have any of the above arrangements implemented in any combination. For example, a manual entry system and an automatic entry system may be provided, respectively, to enable the card for short and long periods of use. Alternatively, the arrangements may work in parallel, and the near field tag 41 would be enabled only if the light sensor was activated and the correct PIN was entered (for example). Further, the arrangements may work in series—for example, the near field tag 41 would be enabled if the light sensor was activated and the correct PIN was subsequently entered.

In the arrangements described above the tag 41 and the mechanism for activating/deactivating the near field tag 41 is incorporated into the mobile terminal. Alternatively, the mechanism for activating/deactivating the tag may be incorporated directly into the smart card or SIM 15 itself. Also, the tag 41 or part of the tag 41 may be incorporated into the SIM 15.

The principle of controlling operation of a near field tag by means of a smart card or SIM is not restricted to an arrangement where the SIM is, or is always, associated with a mobile terminal 1. For example, the SIM may be associated with a "dongle" of the type disclosed in WO-A-2004 036513.

Figure 3:
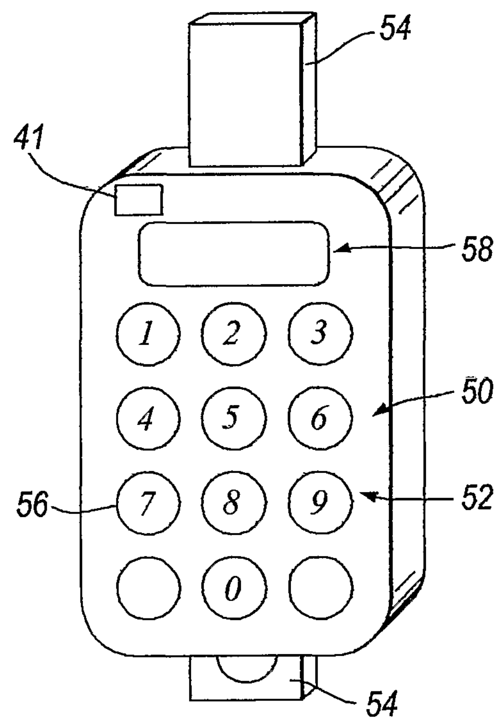
FIG. 3 shows schematically a dongle in accordance with embodiment of the invention.

FIG. 3 shows such a dongle. According to FIG. 3, the dongle 50 has the SIM accommodated completely within its housing 52, and the SIM cannot therefore be seen in the Figure. The dongle 50 has a connector 54 for connection to a PC. At the opposite end of the casing 52 an optional loop connector 54 may be provided to provide a convenient means for carrying the dongle 50 by attaching it to a user's key ring.

One face of the housing 52 has a variety of push buttons 56 mounted thereon, ten of which have respective numerals from 0 to 9 displayed thereon. In this embodiment, the dongle 50 includes means (such as software) for receiving the entry of a PIN number from a user by operating the appropriately designated push buttons 46 which is compared to the PIN number provided for and stored on the SIM. The SIMs used in the mobile telecommunications network are conventionally provided with such a PIN.

The housing 52 may further optionally provide a display 58 for prompting the user to enter their PIN number and/or for displaying the PIN number as it is entered, if desired. On entry of the PIN number using the push buttons 56, the entered PIN number is compared to the PIN number stored on the SIM. If the PINs are found to match, communication between the SIM and the PC is permitted to authenticate one or more transactions. The comparison between the entered PIN number and the PIN number stored on the SIM 15 is performed within the dongle 50, and neither the entered PIN number nor the PIN number stored on the SIM is communicated to the PC. This prevents or reduces the likelihood that the PINs will become compromised by disclosure to an authorised party.

To allow entry of the PIN the dongle 50 requires a power supply. Power can be provided by the PC. Advantageously, the PIN has its own temporary power supply which allows the PIN to be entered and verified. Subsequently, the power supply is interrupted and the PIN data is lost. This is an additional security feature, and is described in more detail below.

The PIN entry comparison arrangement of FIG. 3 may be provided in addition to or as an alternative to the other security measures described herein.

The dongle may also incorporate the near field tag 41. The SIM within the dongle can only communicate with the mobile telecommunications network 3 when it is connected to another device, such as a mobile terminal or a PC that is connected to the mobile telecommunications network 3 via the Internet. When this connection between the SIM and the mobile telecommunications network 3 occurs, OTA update messages for the SIM can be received and downloaded to the SIM within the dongle. The commands within these messages can then be executed by the SIM and used to control the tag. The commands may activate/deactivate the tag according to a timetable or set of events, and the SIM controls activation/deactivation of the tag in accordance with these commands even when the SIM is no longer connected to the mobile telecommunications network.

In another example, the SIM and the near field tag may be incorporated in a data card, which allows a notebook computer or other device to communicate wirelessly with mobile telecommunications network 3.

Figure 4A:
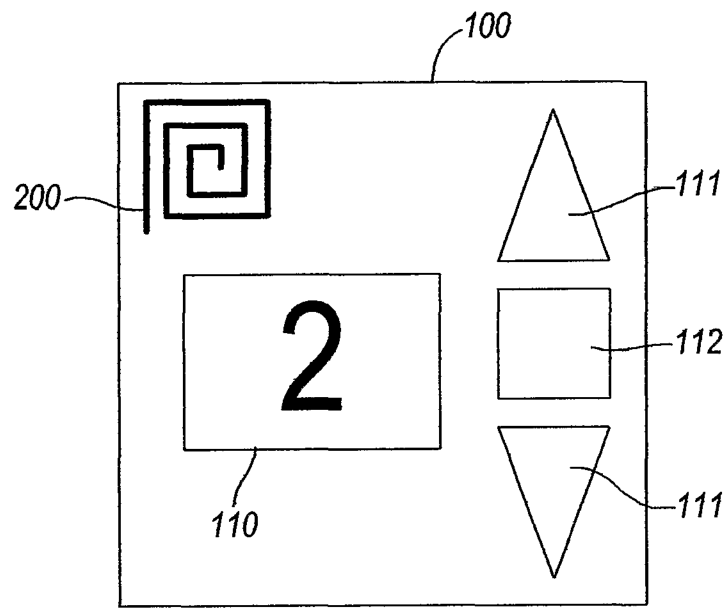
FIGS. 4 to 8 show modified smart cards in accordance with embodiments of the invention.

FIG. 4*a* shows a SIM or smart card 100 with an in-built near field tag including an inductive antenna 200, and a PIN entry system. Due to the size of a smart card 100 the PIN entry system consists of a small display 110 which shows the current number. An "up" and "down" button 111 will allow the user to go through the numbers and an "enter" button 112 will allow the user to select a number.

Figure 4B:
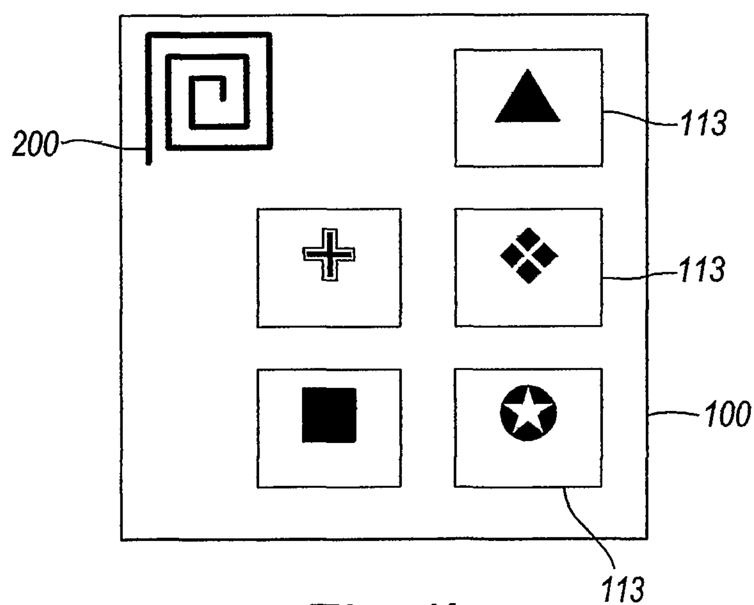

FIG. 4*b* shows another PIN entry system that uses symbols printed on buttons 113 on the smart card 100 and the user must enter the symbol in the correct order to activate the tag.

Figure 5:
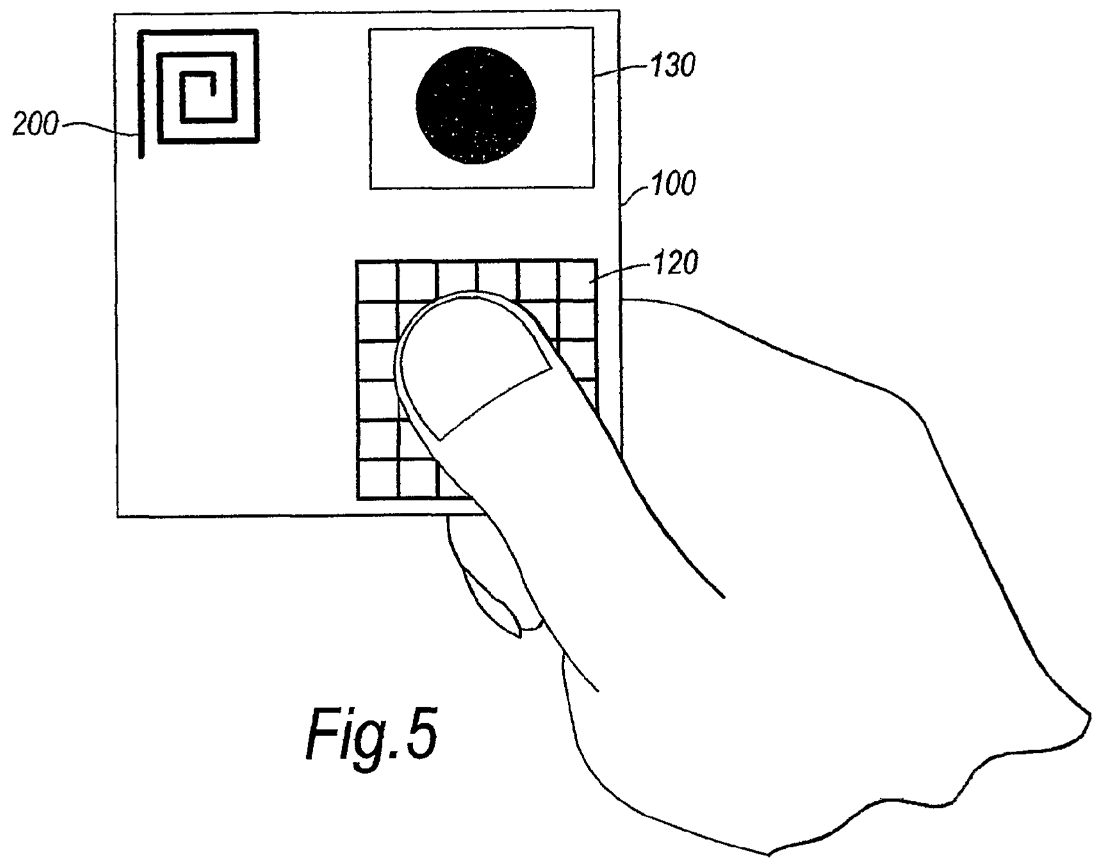

FIG. 5 shows a smart card 100 with an in-built near field tag including an inductive antenna 200, and a biometric system 120 for reading a finger print. The print is ideally compared to a previously taken print stored in the memory 130 of the smart card 100 or may just be judged as having the characteristics of a non-specific fingerprint.

Figure 6:
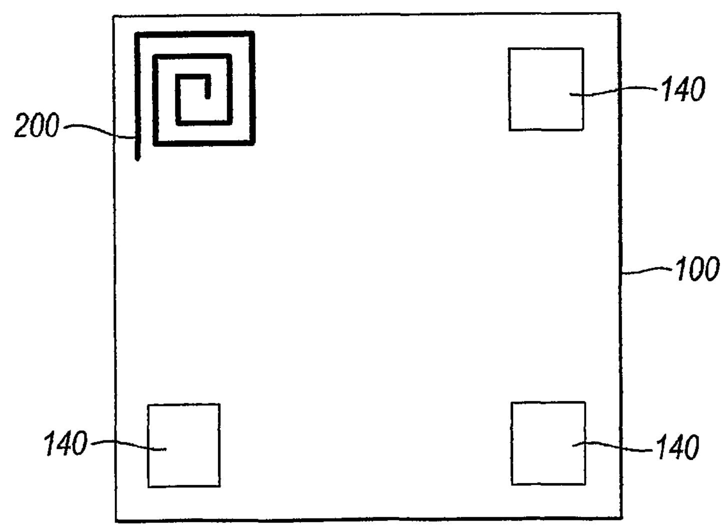

FIG. 6 shows a smart card 100 with an in-built near field tag including an inductive antenna 200, and photo diode 140 that enable the card when the diode 140 is exposed to light. The smart card 100 may contain single or multiple photo diodes 140. To prevent accidental activation multiple photo diodes 140 may have to be activated to make the smart card 100 enabled.

Figure 7:
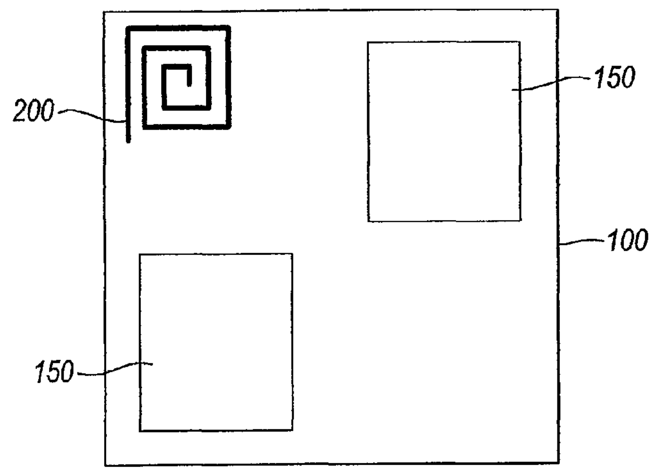

FIG. 7 shows a smart card 100 with an in-built inductive antenna 200 and pressure sensor 150 that enables the card when the card is being held. To prevent accidental activation multiple pressure sensors 150 may have to be activated to make the smart card 100 enabled. The card may contain multiple pressure sensors 150 on the same face of the smart card 100 or on the opposite face of the smart card 100. The smart card 100 may require a single hand to operate or two hands to operate.

Figure 8:
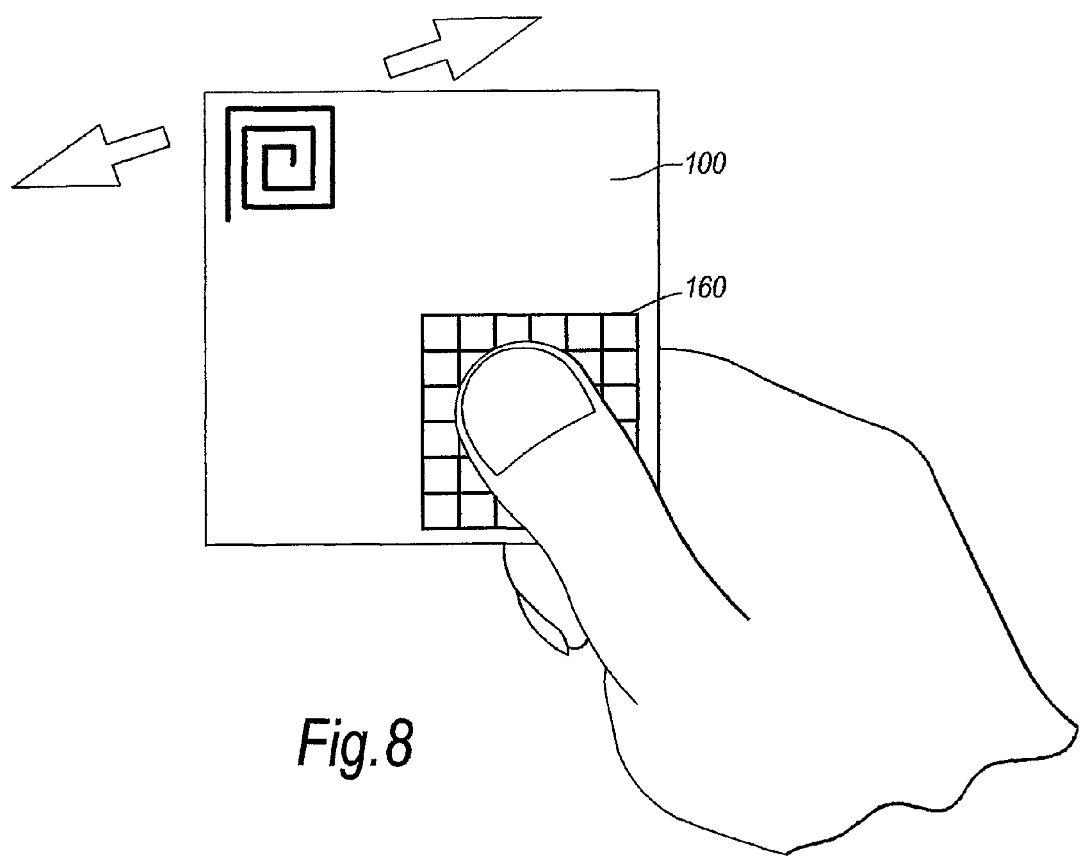

FIG. 8 shows a smart card 100 with an in-built inductive antenna 200 and an inertial sensor 160 that enables the card when the card is being waved around at a sufficient speed.

Figure 9:
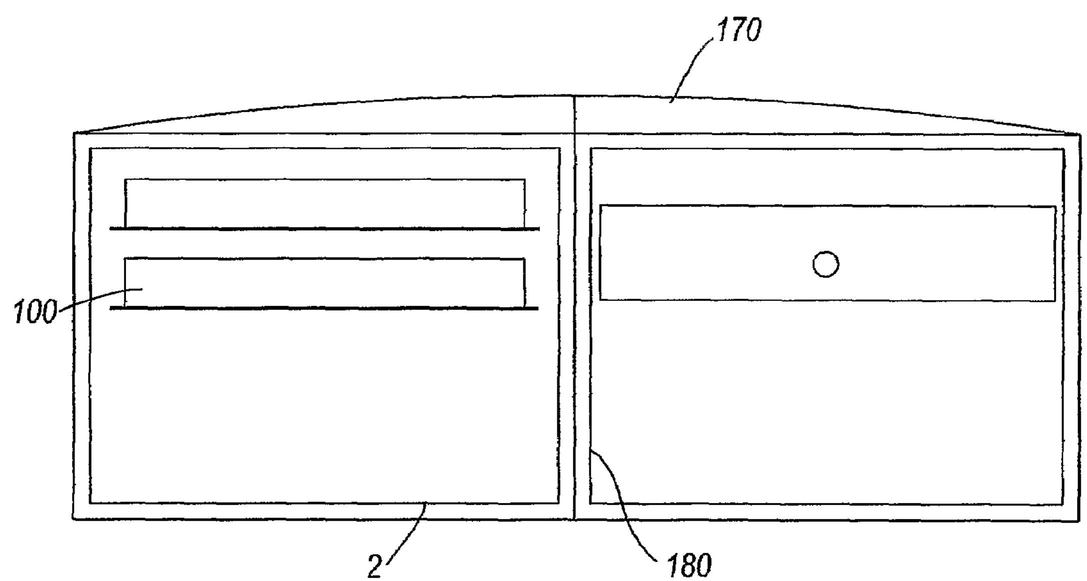
FIG. 9 shows a wallet for storing a smart card in accordance with the invention.

FIG. 9 shows a wallet/purse 170 with metal shielding 180 that prevents RF signals reaching the smart card 100 held in the wallet/purse 170. The tag cannot be read while in the wallet/purse 170.

The features described in relation to a SIM in FIGS. 4*a* to 9 could be applied to a device incorporating a SIM, such as a mobile terminal, datacard or dongle.

A mobile terminal 1 incorporating a near field tag 41 may incorporate other security features. For example, the mobile terminal (or the SIM) may limit use of the tag. For example, the mobile terminal (or SIM) may maintain a record of the number of uses of the tag made within a predetermined time period. If the number of uses within that predetermined time period exceeds a threshold, further uses may not be permitted. Alternatively, or additionally, the mobile terminal (or SIM) may provide an indicator that the tag is being used. For example, when the tag is being read, the mobile terminal may provide a visual indication (such as showing an icon on its display 34, may generate a sound using its built-in loudspeaker or may produce some other physical indication, such as vibrating. These indicators will alert the user to use of the tag. The user will then be able to assess whether the use of the tag is likely to be legitimate or illegitimate.

If shielding is applied to the near field tag, this may advantageously shield all reading attempts except those from a predetermined direction. For example, the shielding may be arranged so that the near field tag (or its antenna) must face the reader directly. This could be provided by shielding in the mobile terminal 1 casing or signal jamming created by the handset. Such shielding will reduce the likelihood that a rogue reader transmitting random read requests will be able to successfully read the tag.

Although the embodiments described use a single near field tag, it should be understood that multiple near field tags may be incorporated in a single SIM or mobile terminal. The SIM may control each of these tags separately in dependence upon OTA update instructions received for the respective tags.

The invention is applicable to any device that uses RF communication and relies on close proximity of a reader for its operation.

The invention claimed is:

1. An apparatus comprising:

a near field communication device able to transmit over a near field; and a smart card coupled with the near field communication device, the smart card being associable with a mobile telecommunications network and configured to authenticate with the network, wherein the transmission ability of the near field communication device is selectively enabled and disabled automatically by the smart card in dependence upon data received by the smart card directly from the mobile telecommunications network.

2. The apparatus of claim 1, wherein the smart card is operable to selectively enable the near field communication device by selectively enabling the near field communication device to be read by a reader.

3. The apparatus of claim 1 further comprising means for operatively coupling the smart card to the mobile telecommunications network, the data being received by the smart card directly from the mobile telecommunications network through the means for operatively coupling.

4. The apparatus of claim 3, wherein the means for operatively coupling comprises a mobile terminal for communicating wirelessly with the mobile telecommunications network.

5. The apparatus of claim 3, wherein the means for operatively coupling comprises a device for coupling the smart card to a data processing apparatus, which data processing apparatus is connectable to the mobile telecommunications network.

6. The apparatus of claim 1, wherein predetermined authentication information respective to a user is stored on the smart card, the smart card being registered with the mobile telecommunications network, which includes means for authenticating.

7. The apparatus of claim 1, further comprising means for entering security data.

8. The apparatus of claim 7, wherein the means for entering security data comprises an alphanumeric data entry device.

9. The apparatus of claim 7, wherein the means for entering security data comprises a keypad.

10. The apparatus of claim 7, wherein the means for entering security data comprises means for comparing an entered Personal Identification Number (PIN) with a PIN stored on the apparatus and the transmission ability of the near field communication device is selectively enabled by the smart card only when the respective PINS match.

11. The apparatus of claim 7, wherein the means for entering security data is operable to detect biometric data from a user.

12. The apparatus of claim 7, further comprising a display configured to display security information.

13. The apparatus of claim 1, further comprising a pressure detector coupled to the smart card, the transmission ability of the near field communication device being selectively enabled by the smart card only when a pressure is detected on the pressure detector.

14. The apparatus of claim 1, further comprising a heat detector coupled to the smart card, the transmission ability of the near field communication device being selectively enabled by the smart card only when heat is detected on the heat detector.

15. The apparatus of claim 1, further comprising a movement detector coupled to the smart card, the transmission ability of the near field communication device being selectively enabled by the smart card only when a change of movement is detected by the movement detector.

16. The apparatus of claim 1, further comprising a near field radio jamming operable to selectively jam or disrupt communication to or from the near field communication device as well as communications of other near field communications devices within range of the jamming device.

17. The apparatus of claim 1, further comprising a near field radio shield.

18. The apparatus of claim 17, wherein the near field radio shield allows the near field communication device to receive near field radio from only a predetermined direction.

19. The apparatus of claim 1, wherein the smart card comprises a SIM.

20. The apparatus of claim 1, wherein the data is for programming the smart card.

21. The apparatus of claim 20, wherein the data comprise over-the-air updating messages.

22. The apparatus of claim 20, wherein the data comprise SMS messages.

23. The apparatus of claim 1, wherein the data received by the smart card from the mobile telecommunications network comprises location data and the near field communication device is enabled and disabled by the smart card in dependence upon the location data.

24. The apparatus of claim 1 wherein the near field communication device is enabled and disabled by the smart card in dependence upon authentication of the smart card with the mobile telecommunications network.

25. The apparatus of claim 1, wherein the data received by the smart card from the mobile telecommunications network represent time values and the near field communication device is enabled and disabled by the smart card in dependence upon the time values.

26. A mobile telecommunications network comprising the apparatus of claim 1.

27. A method of controlling a transmission ability of a near field communication device, the method comprising the steps of:

associating a smart card with a mobile telecommunications network for authenticating the smart card with the mobile telecommunications network;

receiving data, by the smart card, directly from the mobile telecommunications network; and automatically enabling, by the smart card, the transmission ability of the near field communication device in dependence upon the data received by the smart card.

28. A communication apparatus comprising:

a near field communication device able to transmit over a near field;

a smart card;

means for enabling the smart card to receive data directly from a mobile telecommunications network to authenticate the communication apparatus; and means for selectively enabling and disabling the transmission ability of the near field communication device in direct dependence upon the data received by the smart card directly from the mobile telecommunications network.

29. A mobile telecommunication device for use with a mobile telecommunications network, the mobile telecommunication device comprising:

a SIM; and a near field communication device, the SIM being operable to selectively enable and disable a transmission ability of the near field communication device by executing commands received by the SIM over the mobile telecommunications network.

30. The mobile telecommunication device of claim 29 further comprising a pressure detector coupled to the SIM, the transmission ability of the near field communication device being selectively enabled by the SIM only when a pressure is detected on the pressure detector.

31. The mobile telecommunication device of claim 29, further comprising a heat detector coupled to the SIM, the transmission ability of the near field communication device being selectively enabled by the SIM only when heat is detected on the heat detector.

32. The mobile telecommunication device of claim 29, further comprising a movement detector coupled to the SIM, the transmission ability of the near field communication device being selectively enabled by the SIM only when a change in movement is detected by the movement detector.

33. A mobile telecommunication device comprising:

a mobile terminal configured to communicate over a mobile telecommunications network;

a near field communication device positioned within the mobile terminal; and a near field radio jamming device operable to selectively jam or disrupt communication to or from the near field communication device as well as communications of other near field communications devices within range of the jamming device.

34. The mobile telecommunication device of claim 29, further comprising a near field radio shield.

35. The mobile telecommunication device of claim 34, wherein the near field radio shield allows the near field communication device to receive near field radio from only a predetermined direction.

36. The apparatus of claim 1, wherein the near field communication device comprises an antenna, and the transmission ability of the near field communication device is selectively disabled by rendering the antenna inoperable such that when the transmission ability of the near field communication device is disabled by the smart card, the near field communication device is able to perform functions not requiring transmission through the antenna.

37. The apparatus of claim 29, wherein the near field communication device comprises an antenna, and the transmission ability of the near field communication device is selectively disabled by rendering the antenna inoperable such that when the transmission ability of the near field communication device is disabled by the SIM, the near field communication device is able to perform functions not requiring transmission through the antenna.

38. The apparatus of claim 1, wherein the data received by the smart card comprises commands received from the mobile telecommunications network.

39. The apparatus of claim 1, wherein the data received by the smart card are contained within an over-the-air message received by the smart card from the mobile telecommunications network.

40. The apparatus of claim 39, wherein the over-the-air message is an over-the-air update message.

41. The method of claim 27, further comprising:

receiving further data, by the smart card, directly from the mobile telecommunications network; and automatically disabling, by the smart card, the transmission ability of the near field communication device in dependence upon the further data received by the smart card.

42. The method of claim 27, wherein the data received by the smart card comprise commands, and wherein automatically enabling, by the smart card, the transmission ability of the near field communication device comprises executing, by the smart card, the received commands.

43. The method of claim 27, wherein the data received by the smart card are contained within an over-the-air message received by the smart card.

44. The method of claim 27, wherein automatically disabling the transmission ability of the near field communication device comprises rendering an antenna of the near field communication device inoperable such that the near field communication device is able to perform functions not requiring transmission through the antenna when the transmission ability of the near field communication device is disabled.

45. The mobile telecommunication device of claim 29, wherein the SIM is operable to selectively enable and disable the transmission ability of the near field communication device automatically.

46. The mobile telecommunication device of claim 29, wherein the commands are received by the SIM within an over-the-air message.

* * * * *